(12) United States Patent　(10) Patent No.: US 9,010,084 B2
Chelin et al.　(45) Date of Patent: Apr. 21, 2015

(54) AIRCRAFT NACELLE INCLUDING AN OPTIMISED ACOUSTIC PROCESSING SYSTEM

(75) Inventors: Frédéric Chelin, Encausse (FR); Alain Porte, Colomiers (FR); Fabrice Gantie, Toulouse (FR); Jacques Lalane, Saint Orens de Gameville (FR)

(73) Assignee: Airbus Operations SAS, Toulouse (FR)

( * ) Notice: Subject to any disclaimer, the term of this patent is extended or adjusted under 35 U.S.C. 154(b) by 932 days.

(21) Appl. No.: 13/145,451

(22) PCT Filed: Jan. 28, 2010

(86) PCT No.: PCT/FR2010/050137
§ 371 (c)(1),
(2), (4) Date: Nov. 16, 2011

(87) PCT Pub. No.: WO2010/086560
PCT Pub. Date: Aug. 5, 2010

(65) Prior Publication Data
US 2012/0048389 A1　Mar. 1, 2012

(30) Foreign Application Priority Data

Feb. 2, 2009　(FR) ...................................... 09 50634
Nov. 5, 2009　(FR) ...................................... 09 57820

(51) Int. Cl.
*F02K 3/02*　(2006.01)
*B64D 15/04*　(2006.01)
*B64D 33/02*　(2006.01)

(52) U.S. Cl.
CPC ................ *B64D 15/04* (2013.01); *B64D 33/02* (2013.01); *B64D 2033/0206* (2013.01); *B64D 2033/0233* (2013.01); *Y02T 50/67* (2013.01); *Y02T 50/672* (2013.01)

(58) Field of Classification Search
USPC ........ 181/214, 222; 137/15.1; 244/1 N, 53 B; 60/226.1, 796
See application file for complete search history.

(56) References Cited

U.S. PATENT DOCUMENTS 3,566,606 A　3/1971　Mortlock
3,763,874 A * 10/1973 Wilde et al. .................. 137/15.1
(Continued)

FOREIGN PATENT DOCUMENTS

EP　1 495 963 A2　1/2005
FR　2 014 140 A　4/1970
(Continued)

OTHER PUBLICATIONS

International Search Report, dated Oct. 5, 2010, from corresponding PCT application.

*Primary Examiner* — William H Rodriguez
(74) *Attorney, Agent, or Firm* — Young & Thompson

(57) ABSTRACT

An aircraft nacelle including a pipe (32), a peripheral wall (34), a lip (36), and a front frame (38) connecting the peripheral wall (34) and the pipe (32) and forming with the lip (36) a space (50) in which the hot air that is provided for frost treatment can circulate, with the pipe (32) including a coating (44) for the composite material acoustic treatment, is characterized in that the nacelle includes at least one element (52) made of a heat-conducting material inserted between the lip (36) and the pipe (32) ensuring the continuity of the aerodynamic surfaces of the lip (36) and the pipe (32) and the propagation of heat from the space (50) toward the rear of the nacelle, whereby the at least one element (52) includes a coating (54) for acoustic treatment that is made of a heat-resistant material.

20 Claims, 4 Drawing Sheets

(56) References Cited

U.S. PATENT DOCUMENTS

| | | | |
|---|---|---|---|
| 6,123,170 A * | 9/2000 | Porte et al. | 181/214 |
| 6,328,258 B1 * | 12/2001 | Porte | 244/53 B |
| 6,848,656 B2 * | 2/2005 | Linton | 244/134 C |
| 8,448,901 B2 * | 5/2013 | Porte et al. | 244/134 B |
| 8,602,346 B2 * | 12/2013 | Porte et al. | 244/1 N |
| 2004/0031878 A1 | 2/2004 | Linton | |
| 2010/0181420 A1 | 7/2010 | Porte et al. | |
| 2010/0199629 A1 | 8/2010 | Chene et al. | |
| 2010/0252689 A1 * | 10/2010 | Vauchel et al. | 244/53 B |
| 2011/0197973 A1 * | 8/2011 | Binks et al. | 137/15.1 |
| 2012/0090693 A1 * | 4/2012 | Chelin et al. | 137/15.1 |
| 2012/0261521 A1 * | 10/2012 | Porte et al. | 244/53 B |
| 2013/0098471 A1 * | 4/2013 | Porte et al. | 137/15.1 |
| 2013/0224000 A1 * | 8/2013 | Porte et al. | 415/182.1 |
| 2014/0001284 A1 * | 1/2014 | Porte et al. | 239/265.11 |

FOREIGN PATENT DOCUMENTS

| | | |
|---|---|---|
| FR | 2 637 251 A1 | 4/1990 |
| FR | 2 840 879 A1 | 12/2003 |
| FR | 2 917 067 A1 | 12/2008 |
| WO | 94/18072 A1 | 8/1994 |
| WO | 20061136748 A2 | 12/2006 |

\* cited by examiner

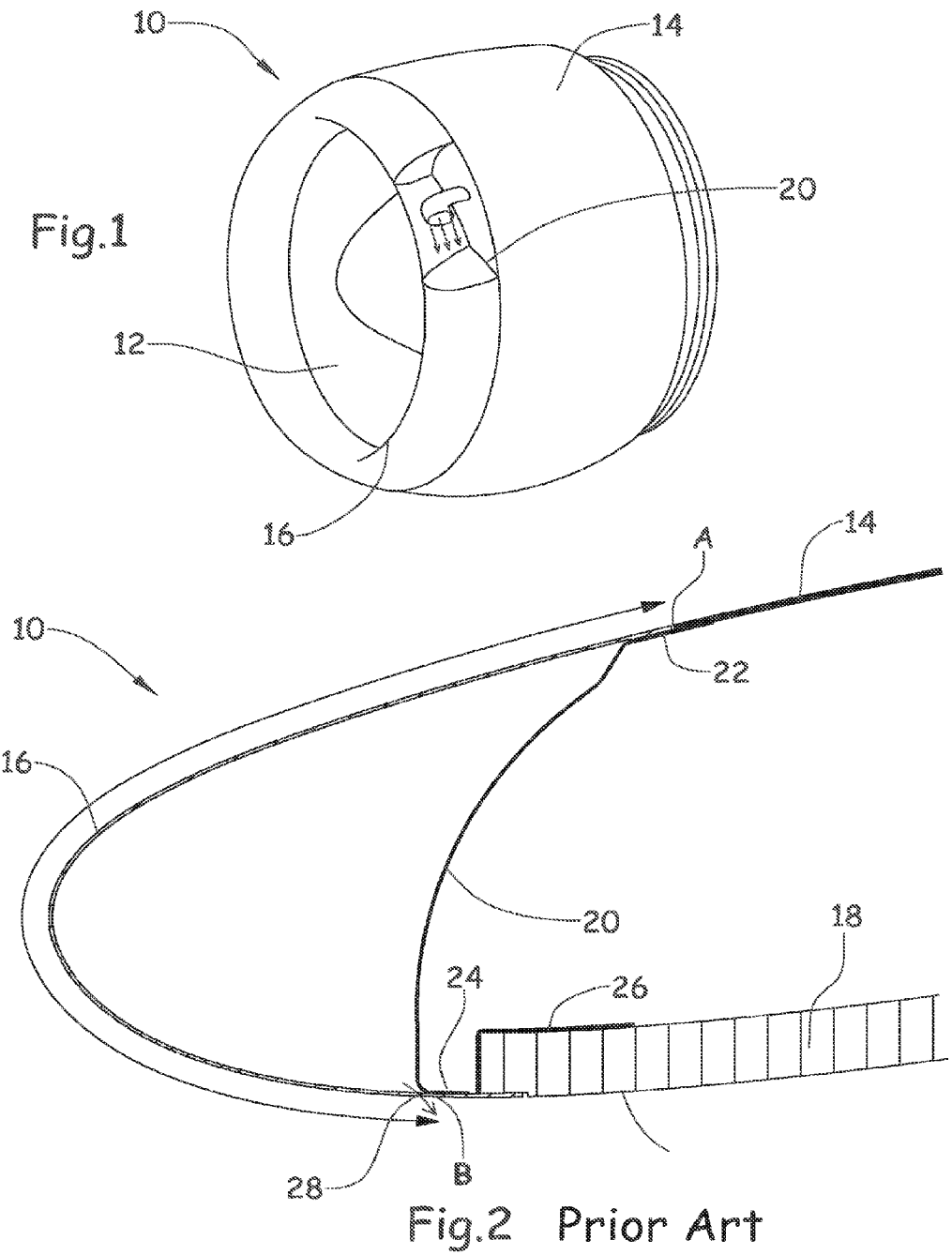

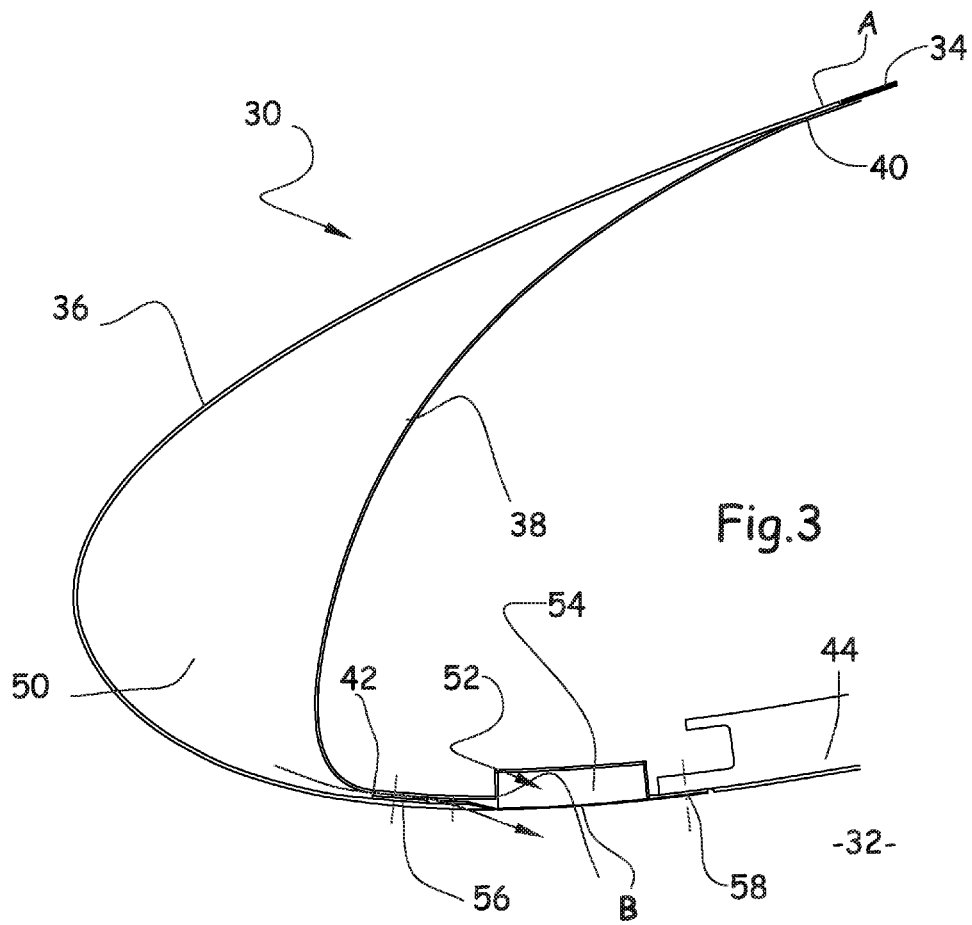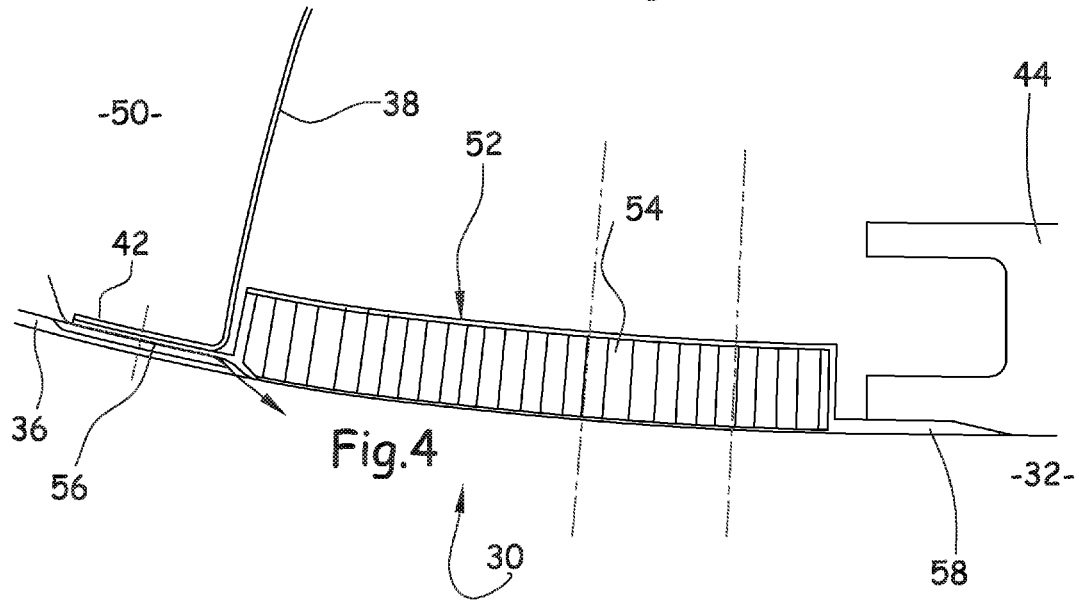

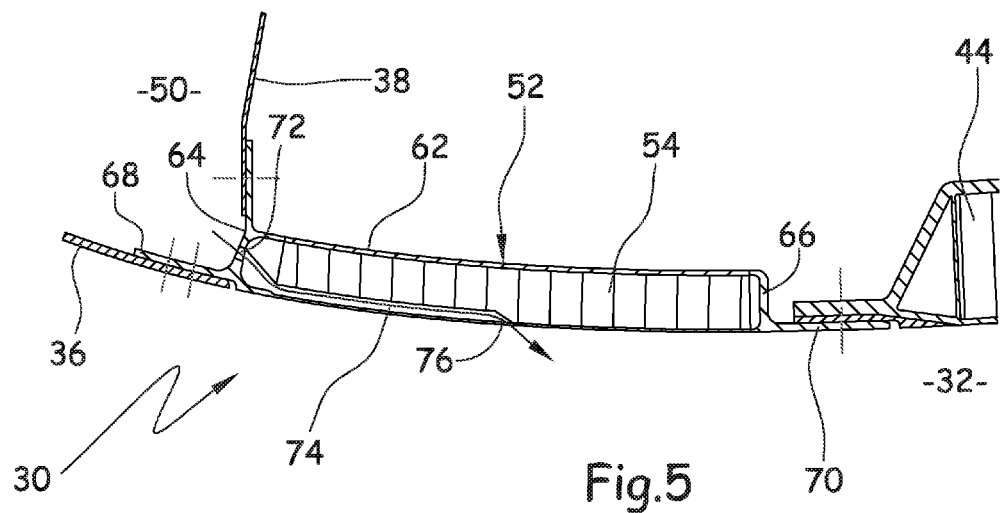
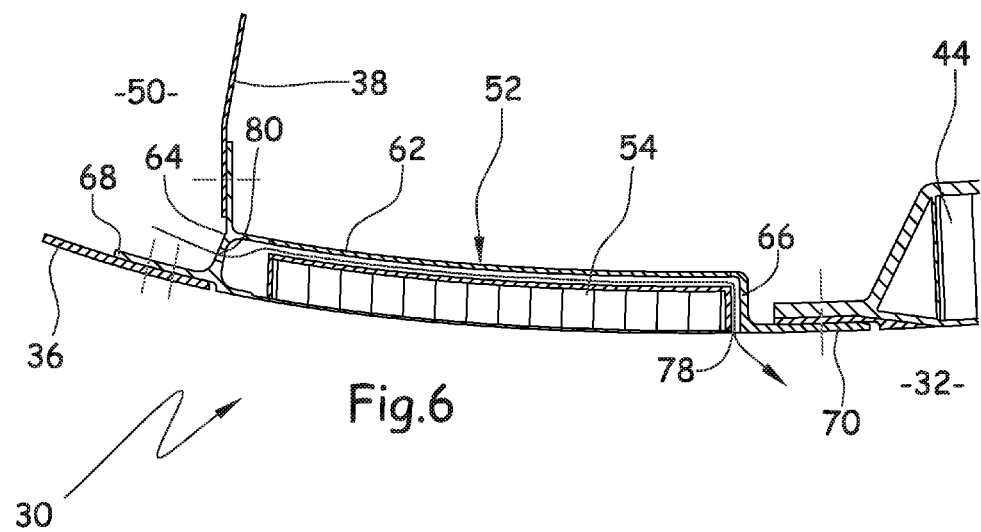

AIRCRAFT NACELLE INCLUDING AN OPTIMISED ACOUSTIC PROCESSING SYSTEM

BACKGROUND OF THE INVENTION

1. Field of the Invention

This invention relates to an aircraft nacelle that comprises an optimized acoustic treatment system.

According to an embodiment that is illustrated in FIGS. 1 and 2, a nacelle 10 comprises at least one pipe 12, a peripheral wall 14, and, at the front, an air intake that is delimited by a lip 16 that connects the pipe 12 and the peripheral wall 14.

In a known manner, the pipe 12 comprises a coating 18 for acoustic treatment comprising—from the outside to the inside—an acoustically resistive porous layer, an alveolar structure, and a reflective layer that is impermeable to sound waves. In general, the coating 18 is made of composite material so as not to increase the on-board weight too much.

To be effective, the acoustic treatment is to take place on the largest surface possible and consequently extends toward the lip.

However, the zone of the lip is also to comprise a frost treatment.

2. Description of the Related Art

The systems that make it possible to prevent the formation and/or the accumulation of ice and/or frost are divided into two large families, the first called defrosting systems that make it possible to limit the formation of ice and/or frost, the second called de-icing systems that limit the accumulation of ice and/or frost and act once the ice and/or frost are formed. Hereinafter, a frost treatment system or process is defined as a defrosting system or process or a de-icing system or process.

BRIEF SUMMARY OF THE INVENTION

This invention relates more particularly to a frost treatment process that consists in using the hot hair sampled at the engine and delivered at the inside wall of the leading edges.

To ensure the operation of the aircraft, the frost treatment is to be done from a point A arranged at the peripheral wall 14 up to a point B that is provided at the pipe 12. For this purpose, a front frame 20 is provided, comprising a junction zone with the peripheral wall 14 at point A and a junction zone with the pipe at point B.

According to one embodiment, to ensure the connection between the panel that forms the lip 16 and the panel that forms the peripheral wall 14, the edges of said panels are flattened and then attached by any suitable means against a flange 22 of the front frame 20.

According to one embodiment, to ensure the connection between the panel that forms the lip 16 and one of the panels that delimits the pipe 12, the edges of said panels overlap and are kept flattened against one another by any suitable means. As illustrated in FIG. 2, the front frame 20 comprises a flange 24 against which the inside surface of the panel of the lip is flattened and attached by any suitable means.

The front frame 20 and the lip 16 define a pipe with a cross-section in the shape of an upside-down D that extends over the entire circumference of the nacelle and in which the hot air circulates, with the position of the front frame 20 depending on the frost treatment zone that extends between the points A and B.

This arrangement is not satisfactory for the following reasons.

This position of the front frame 20 generates a pipe for hot air with a significant volume that requires a significant flow rate of hot air during de-icing. However, the frost treatment can be done during certain phases of flight in which the power plant operates at low speed, not making it possible to generate a flow of hot air that is adequate for optimizing the frost treatment.

According to another drawback, in this position, the front frame is essentially perpendicular to the direction of a bird strike. Also, to withstand such a strike, the front frame should be reinforced by, for example, increasing its thickness or the number of reinforcements that leads to increasing the on-board weight and therefore the energy consumption of the aircraft.

According to another constraint, the frost treatment system should be compatible with an acoustic treatment system that is obtained from composite material elements.

With the metallic front frame 20 emitting thermal radiation, it is necessary to protect the coating 18 for acoustic treatment by covering it with a film or paint 26 that is made of a material that is not very conductive. However, with the temperature of the hot air that is used increasing, this film 26 is no longer adequate so that it is necessary to separate the coating 18 of the front frame 20, which tends to reduce the surface area that is treated on the acoustic level.

According to another constraint that is illustrated in FIG. 2, the hot air that is used for the frost treatment can be delivered into the pipe 12 at a circumferential outlet 28 provided close to the flange 24.

A certain distance is essential between said output 28 and the coating 18 so that the hot air does not burn the outside layer of the coating 18 for the composite material acoustic treatment.

As above, with the temperature of the hot air that is used increasing, it is necessary to separate more significantly the coating 18 for the composite material acoustic treatment of the circumferential output 28, which tends to reduce the surface area that is treated on the acoustic level.

The document FR-2,840,879 proposes an air intake with a frost treatment using hot air that integrates a hot air outlet that is arranged at the front frame, delimited by two angle bars, one with a part that is curved toward the front ensuring a connection with the wall of the air intake and the other with a part that is curved toward the rear ensuring the connection with an acoustic panel that delimits a pipe. Even if one of the angle bars slightly covers and protects the acoustic panel so that it is not burned by the evacuated hot air, this document does not provide any element whose purpose is to protect the acoustic panel from the radiation of the front frame so that it is necessary to separate the acoustic panel from the front frame if said panel is made of a composite material to protect it.

Also, the purpose of this invention is to remedy the drawbacks of the prior art by proposing a nacelle whose design is optimized in terms of acoustic and frost treatments.

For this purpose, the invention has as its object an aircraft nacelle that comprises a pipe, a peripheral wall, a lip and a front frame connecting the peripheral wall and the pipe and forming with the lip a space in which the hot air that is provided for the frost treatment can circulate, with the pipe comprising a coating for the composite material acoustic treatment, characterized in that the nacelle comprises at least one element made of a heat-conducting material inserted between the lip and the pipe ensuring the continuity of the aerodynamic surfaces of the lip and the pipe and the propagation of heat from the space toward the rear of the nacelle, whereby said element comprises a coating for acoustic treatment that is made of a heat-resistant material.

The element preferably comprises a first part that ensures the mechanical function and that connects the lip, the front frame and the pipe and a second part that can be dissociated from the first part ensuring the function of the acoustic treatment.

BRIEF DESCRIPTION OF THE DRAWINGS

Other characteristics and advantages will emerge from the following description of the invention, a description that is provided only by way of example, relative to the accompanying drawings in which:

FIG. 1 is a perspective view of a nacelle,

FIG. 2 is a cutaway of the front of a nacelle according to the prior art,

FIG. 3 is a cutaway of the front of an aircraft nacelle according to the invention, FIGS. 4 to 6 are cutaways that illustrate in detail different variants of a connecting element between a front frame and a pipe that comprises a panel for acoustic treatment.

DETAILED DESCRIPTION OF THE PREFERRED EMBODIMENTS

Figure 7:
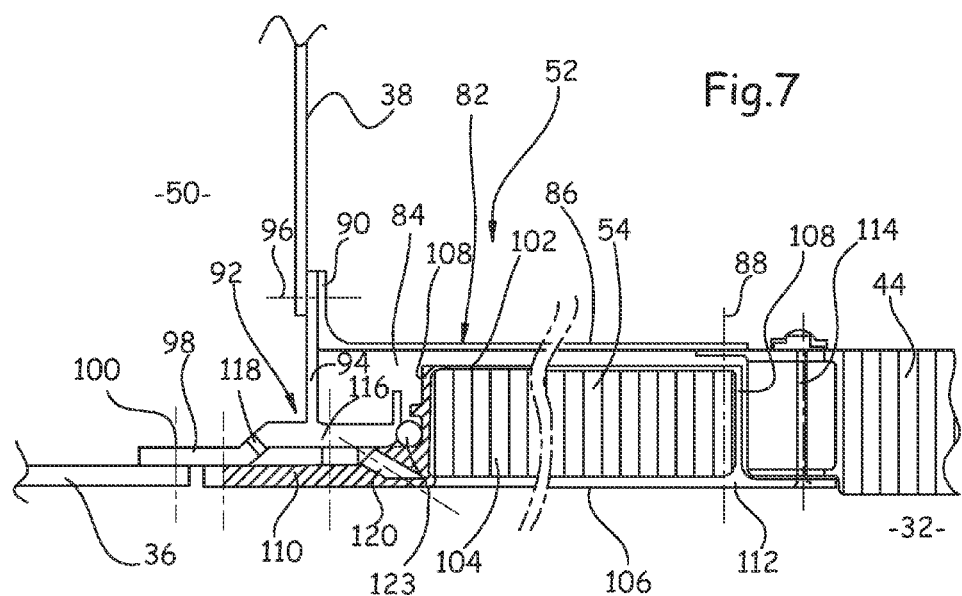
FIG. 7 is a cutaway that illustrates an improved variant of a connecting element between a front frame and a pipe that comprises a coating for acoustic treatment.
Figure 9:
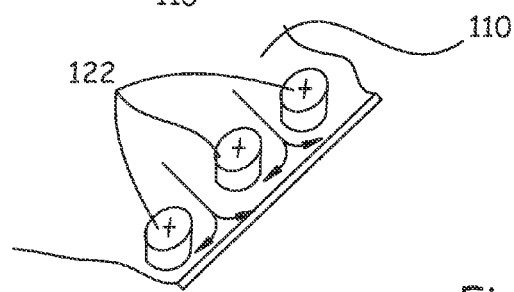
FIG. 9 is a perspective view of a part of the connecting element of the acoustic panel.

As illustrated in FIG. 9, projections or wedges 122, for example circular projections or wedges, can be provided between the extensions 116 and 110 to keep them spaced. Preferably, as shown in FIG. 7, sealing means (123) are inserted between the curved end of the extension 116 of the junction part and the front edge 108 of the coating 54 so as to limit the propagation of hot air in the cavity 84.

In FIGS. 3 to 7, a nacelle that comprises a pipe 32, a peripheral wall 34, as well as a lip 36 at the front connecting said pipe 32 and said peripheral wall 34 and delimiting an air intake has been shown at 30. The other elements of the nacelle are not described because they are known to one skilled in the art.

In general, the wall of the pipe (or the lip) is obtained by the assembly of several panels, several plates, several skins or the like. Hereinafter, all of these forms of the wall will be designated by the term panel.

The structure of the nacelle 30 comprises a front frame 38 that connects the peripheral wall 34 and the pipe 32 and that supports the lip 36.

At a first edge, the front frame 38 can comprise a support surface 40 at which the peripheral wall 34 and/or the lip 36 are made integral.

According to one embodiment, for reducing the influence on the drag, the panels of the peripheral surface and the lip are placed end to end and do not overlap and are both made integral with the support surface 40.

At a second edge, the front frame 38 can comprise a support surface 42 at which the pipe 32 and/or the lip 36 are made integral.

So as to reduce the noise pollution, the pipe 32 comprises a coating 44 for the composite material acoustic treatment, comprising—from the inside to the outside—an acoustic reflective layer, at least one alveolar structure, and at least one acoustically resistive structure. The coating for acoustic treatment is not presented in detail because it is also known by one skilled in the art. To limit the on-board weight, the elements that form the acoustic coating are made of composite material.

The nacelle also comprises a frost treatment system at the lip 36 that should cover a zone that extends along a longitudinal cross-section of a point A provided at the peripheral wall 34 at a point B that is provided at the pipe 32.

This invention relates more particularly to the nacelles that integrate a system for frost treatment by hot air. In this case, means are provided for blowing in hot air into the lip so that the latter—in contact with the inside surface of the lip—prevents the formation of frost or its accumulation at the outside surface of the lip.

According to one embodiment, the hot air is sampled at the power plant, and ducts are provided for directing it into the space 50 that is delimited by the front frame 38 and the lip 36 that forms a circumferential pipe. These different elements are not described in more detail because they are known to one skilled in the art.

According to the invention, the junction zone of the front frame 38 with the lip 36 at the air intake of the nacelle is offset toward the front of the nacelle relative to point B, and at least one element 52 made of a heat-conducting material inserted between the lip 36 and the pipe 32 ensures the continuity of the aerodynamic surfaces of the lip 36 and the pipe 32 and the heat propagation from the space 50 to the rear of the nacelle in such a way that the zone that extends from point A to point B is treated at the level of the frost.

This solution makes it possible to separate the hot air from the space 50 and the front frame 38 from the composite material acoustic coating 44.

The element 52 ensures the propagation of heat from the space 50 to the rear of the nacelle, which makes it possible to extend the frost treatment beyond the junction zone of the front frame 38 and the lip 36. However, with this element 52 being in contact with the air stream entering the nacelle, it gradually cools so that there is a temperature gradient between the junction zone of said element 52 with the lip 36 and the junction zone of said element 52 with the pipe 32. Thus, the temperature of the element 52 at its junction zone with the pipe 32 is compatible with the coating 44 for the composite material acoustic treatment. The propagation of the frost treatment beyond the front frame 30 in the direction of the rear of the nacelle originates from the propagation of the heat by conduction through the element 52.

According to another advantage of the invention, the fact of offsetting the junction zone between the front frame 38 and the lip 36 toward the front of the nacelle makes it possible to reduce the volume of the space 50 and therefore the flow rate that is necessary to the hot air. Thus, this arrangement makes it possible to extend the frost treatment that takes place during certain phases of the flight in which the power plant operates at low speed and delivers only a reduced flow of hot air.

According to another advantage, the front frame is more inclined relative to the prior art, which reinforces its resistance to bird strikes, thus contributing to optimizing its weight.

According to another characteristic of the invention that is illustrated in FIGS. 4 to 7, the element 52 comprises a coating 54 for acoustic treatment made of a heat-resistant material, for example a metal material. This arrangement makes it possible to optimize the acoustic treatment by increasing the treated surface area.

This coating comprises—from the inside to the outside—an acoustic reflective layer, at least one alveolar structure, and at least one acoustically resistive structure, whereby the latter forms the surface in contact with the air stream entering the nacelle.

According to the invention, the system for acoustic treatment comprises two parts, a first part made of composite material and a second part made of a heat-resistant material that is inserted between the first part and the space 50 that is provided for the hot air of the frost treatment. This arrangement makes it possible to optimize the acoustic treatment to the extent that the treated surface is increased while making it compatible with the frost treatment and by limiting the on-board weight.

Preferably, means for preventing hot air from penetrating in the cells of the alveolar structure are provided so that the acoustic treatment is not affected by the frost treatment.

Preferably, the element 52 comprises means for evacuating the hot air that is used for the treatment of frost in the pipe 32.

Advantageously, the direction of the ejected hot air stream forms an angle with the outside surface that varies from 5° to 60°. Preferably, the angle is between 5 and 30° to obtain a good compromise between the cooling of the hot air and the disturbances of the aerodynamic stream circulating in the pipe.

According to a first variant that is illustrated in detail in FIG. 4, the element 52 comprises, at the front, a plate 56 that extends toward the front, ensuing the connection between the element 52, the front frame 38, and the lip 36 and, at the rear, a plate 58 that extends toward the rear ensuring the connection between the element 52 and the pipe 32 and more particularly with the panel for acoustic treatment 44.

According to this variant, the surface of the lip 36 and the surface of the front plate 56 of the element 52 are spaced at least at certain locations for making possible the passage of hot air from the space 50 to the pipe of the nacelle, inside of which flows the entering air.

According to one embodiment, the surface of the lip 36 and/or the surface of the front plate 56 of the element 52 comprise hollow shapes in the form of longitudinal grooves that form a number of channels extending from the space 50 up to the pipe 32 of the nacelle.

According to the two variants that are illustrated in FIGS. 5 and 6, the element 52 also ensures the function of a connecting element between the front frame 38 and the lip 36.

According to a first embodiment that is illustrated in FIG. 5, the element comprises a rear surface 62, at the front a first wall 64 in an essentially annular shape arranged in an essentially transversal plane whose end is connected by any suitable means to the front frame 38, and at the rear a second wall 66.

The first wall 64 comprises an extension 68 toward the front of the nacelle that is connected by any suitable means to the lip 36.

The second wall 66 comprises an extension 70 to the rear of the nacelle that is connected by any suitable means to the pipe 32 and in particular to the coating 44 for acoustic treatment.

According to the variant that is illustrated in FIG. 5, the rear surface 62 ensures the function of an acoustic reflective layer. According to this variant, the dimensions of the element 52, in particular its height, are adapted based on the desired height of the acoustic coating 54. According to this variant, the first wall 64 comprises at least one opening 72 that makes it possible to link the space 50 with at least one channel 74 that is made in the coating 54 for acoustic treatment, whereby said channel 74 is preferably provided between the alveolar structure and the acoustically resistive layer for directing the hot air from the opening 72 up to at least one output 76 that is made at the acoustically resistive layer and to eject the hot air in the pipe 32 of the nacelle. For this purpose, at least one U-shaped wall is inserted between the acoustically resistive layer and the alveolar structure in such a way as to delimit a channel 74 with said acoustically resistive layer and to prevent the hot air from penetrating the cells of said alveolar structure.

According to the variant that is illustrated in FIG. 6, the rear surface 62 does not ensure the function of reflective layer of the coating 54 for acoustic treatment. According to this variant, the coating 54 for acoustic treatment comprises—from the inside to the outside—an acoustic reflective layer, at least one alveolar structure, at least one acoustically resistive layer, whereby said acoustic reflective layer is separated from the rear wall 62 in such a way as to make a spacing allowing the passage of hot air, the latter being evacuated at at least one output 78 provided close to the second wall 66, with the first wall 64 comprising an opening 80 that makes it possible to link the space 50 and the space provided between the reflective layer and the rear wall 62. According to this embodiment, partitions are provided at the coating edges 54 for acoustic treatment for preventing the hot air from penetrating the cells of the alveolar structure.

Figure 8:
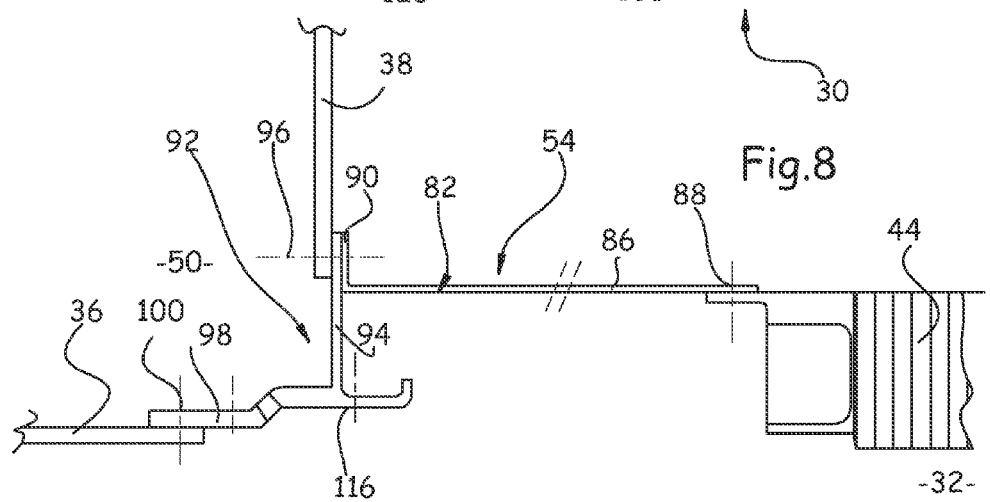
FIG. 8 is a cutaway that illustrates an improved variant of a connecting element between a front frame and a pipe whose coating for acoustic treatment of the connecting element has been removed.

FIGS. 7 to 9 show another embodiment for which the element 52 is made in two parts, a first part 82 ensuring the mechanical function and connecting the lip 36, the front frame 38, and the pipe 32, and a second part that can be dissociated from the first part ensuring the acoustic treatment function.

In this case, the first part 82 forms an open cavity 84 in the direction of the pipe of the nacelle and is able to house the coating for acoustic treatment whose acoustically resistive layer closes said cavity 84 and ensures the continuity between the lip 36 and the wall of the pipe 32.

According to the illustrated embodiment, the first part comprises a cylindrical portion 86 that forms a rear wall whose diameter is greater than that of the pipe of the nacelle.

This cylindrical portion 86 is connected by any suitable means 88 to the pipe 32 and in particular to the coating 44 for the composite material acoustic treatment.

This cylindrical portion 86 is connected at the front to the front frame 38 and to the lip 36. According to one embodiment, the cylindrical portion comprises a curved edge 90 that extends in a plane that is essentially parallel to the front frame 38, and a junction part 92 is provided between the front frame 38, the lip 36, and the cylindrical portion 86. This junction part 92 comprises a first wall 94 in a radial plane of which one edge is inserted between the front frame 38 and the curved edge 90, whereby these three elements are connected by any suitable means 96 (rivets, bolts, etc.), and an extension toward the front 98 is connected by any suitable means 100 to the lip 36.

FIG. 8 shows the element 52 without an acoustic coating 54. Thus, the first part 82 ensures the uptake of mechanical forces, so that it is optionally possible to remove the acoustic coating 54 without the different elements—front frame 38, lip 36 and pipe 32—being disengaged, which contributes to simplifying the maintenance.

According to another aspect of the invention, the coating 54 for acoustic treatment is less stressed on the mechanical level; it is possible to provide a coating 54 for acoustic treatment made of several angular sectors placed end to end and not connected by splices. This configuration has the advantage of reducing the on-board weight and optimizing the treated surface on the acoustic level (the latter is not reduced because of the presence of splices).

As above, the acoustic coating 54 is metallic to withstand high temperatures (greater than those supported by the same element that is made of composite material).

This coating 54 for acoustic treatment comprises a reflective layer 102, distant from the cylindrical portion 86, at least one alveolar structure 104, and at least one acoustically resistive layer 106, ensuring the continuity between the lip 36 and the pipe 32.

The fact of providing a reflective layer 102 that is spaced from the first part 82 of the connecting element 52 makes it possible to create a layer of insulating air limiting the diffusion of heat to the rear of the front frame 38.

The coating 54 can be made of several angular sectors or a single part.

Preferably, at least the edges 108 that are arranged toward the front and the rear of the coating are delimited by sealed walls.

To make it integral with the rest of the nacelle, the coating 54 for acoustic treatment comprises an extension 110 toward the front coming into the extension of the lip as well as an extension 112 toward the rear for making integral the metallic coating 54 with the composite material coating 44 by any suitable means 114.

Advantageously, the junction part 92 comprises an extension toward the rear 116 whose end is curved to be essentially parallel to the edge 108 of the acoustic coating 54.

The extension 116 of the junction part 92 is distant from the extension 110 of the coating 54 to make it possible for hot air to circulate between at least one opening 118 made at the extension 98 toward the front of the junction part 92 and at least one opening 120 at the extension 110 toward the front of the coating 54, close to the front edge 108 in such a way as to direct the hot air from the space 50 to the pipe 32.

As illustrated in FIG. 9, projections or wedges 122, for example circular projections or wedges, can be provided between the extensions 116 and 110 to keep them spaced. Preferably, sealing means are inserted between the curved end of the extension 116 of the junction part and the front edge 108 of the coating 54 so as to limit the propagation of hot air in the cavity 84.

The invention claimed is:

1. An aircraft nacelle, comprising:
    a pipe (32);
    a peripheral wall (34);
    a lip (36);
    a front frame (38) connecting the peripheral wall (34) and the pipe (32) and forming with the lip (36) a space (50) in which the hot air that is provided for the frost treatment circulates;
    a composite material acoustic coating (44) on the pipe (32); and
    at least one element (52) made of a heat-conducting material inserted between the lip (36) and the pipe (32) ensuring the continuity of the aerodynamic surfaces of the lip (36) and the pipe (32) and the propagation of heat from the space (50) toward the rear of the nacelle,
    wherein said element (52) comprises a coating (54) for acoustic treatment that is made of a heat-resistant material, and
    wherein the element (52) comprises a first part (82) that ensures the mechanical function and that connects the lip (36), the front frame (38), and the pipe (32), and a second part that is dissociable from the first part that ensures the function of the acoustic treatment.

2. The aircraft nacelle according to claim 1, wherein the first part (82) comprises a cylindrical portion (86) whose diameter is greater than that of the pipe (32) in such a way as to form a cavity (84) that is open in the direction of the pipe of the nacelle and able to house a coating (54) for acoustic treatment whose acoustically resistive layer closes said cavity (84) and ensures the continuity between the lip (36) and the wall of the pipe (32).

3. The aircraft nacelle according to claim 2, wherein the first part (82) comprises a junction part (92) that ensures the junction between the lip (36), the front frame (38), and the cylindrical portion (86).

4. The aircraft nacelle according to claim 2, wherein the coating (54) for acoustic treatment comprises a reflective layer (102) that is distant from the cylindrical portion (86).

5. The aircraft nacelle according to claim 4, wherein the coating (54) for acoustic treatment comprises an extension (112) toward the rear for making it integral with the composite material coating (44).

6. The aircraft nacelle according to claim 4, wherein the coating (54) for acoustic treatment comprises an extension (110) toward the front that comes into the extension of the lip (36).

7. The aircraft nacelle according to claim 6, wherein the junction part (92) comprises an extension toward the rear (116) that is distant from the extension (110) of the coating (54) for making it possible for the hot air to circulate from the space (50) in the direction of the pipe (32) via at least one outlet opening (120) at the extension (110).

8. The aircraft nacelle according to claim 7, wherein the projections or wedges (122) are provided between the extensions (116, 110) of the junction part (92) and the coating (54) for keeping them spaced.

9. The aircraft nacelle according to claim 8, wherein a seal (123) is inserted between the extension (116) of the junction part and the front edge of the coating (54) for acoustic treatment.

10. The aircraft nacelle according to claim 9, wherein a seal (123) is inserted between the extension (116) of the junction part and the front edge of the coating (54) for acoustic treatment.

11. The aircraft nacelle according to claim 7, wherein a seal (123) is inserted between the extension (116) of the junction part and the front edge of the coating (54) for acoustic treatment.

12. The aircraft nacelle according to claim 5, wherein the coating (54) for acoustic treatment comprises an extension (110) toward the front that comes into the extension of the lip (36).

13. The aircraft nacelle according to claim 12, wherein the junction part (92) comprises an extension toward the rear (116) that is distant from the extension (110) of the coating (54) for making it possible for the hot air to circulate from the space (50) in the direction of the pipe (32) via at least one outlet opening (120) at the extension (110).

14. The aircraft nacelle according to claim 13, wherein the projections or wedges (122) are provided between the extensions (116, 110) of the junction part (92) and the coating (54) for keeping them spaced.

15. The aircraft nacelle according to claim 3, wherein the coating (54) for acoustic treatment comprises a reflective layer (102) that is distant from the cylindrical portion (86).

16. The aircraft nacelle according to claim 15, wherein the coating (54) for acoustic treatment comprises an extension (112) toward the rear for making it integral with the composite material coating (44).

17. An aircraft nacelle, comprising:
    a pipe (32);
    a peripheral wall (34);

a lip (36) located forward of the pipe (32) and the peripheral wall (34);

a front frame (38) connecting the peripheral wall (34) and the pipe (32), and supporting the lip (36), the lip (36) extending forward from the peripheral wall (34) to the pipe (32) with the lip being forward of the front frame (38);

a hot air space (50) delimited by the front frame (38) and the lip (36), the hot air space accommodating circulation of hot air provided for the frost treatment;

a composite material acoustic coating (44) on the pipe (32); and an element (52) made of a heat-conducting material located rearward of the front frame (38) and the lip (36), and forward of the composite material acoustic coating (44) on the pipe (32) such that the element (52) made of a heat-conducting material is located between the lip (36) and the pipe (32) providing a continuity of the aerodynamic surfaces from the lip (36) to the pipe (32) and the propagation of heat from the hot air space (50) toward a rear of the nacelle, wherein said element (52) comprises an acoustic treatment coating (54) that is made of a heat-resistant material.

18. The aircraft nacelle according to claim 17, wherein the element (52) comprises a first part (82) that provides a mechanical function and that connects the lip (36), the front frame (38), and the pipe (32), and a second part that is dissociable from the first part that ensures the function of the acoustic treatment.

19. The aircraft nacelle according to claim 18, wherein the first part (82) comprises a cylindrical portion (86) whose diameter is greater than a diameter of the pipe (32) so as to form a cavity (84) that is open in the direction of the pipe (32) and houses the acoustic treatment coating (54) whose acoustically resistive layer closes said cavity (84) and ensures continuity between the lip (36) and the wall of the pipe (32).

20. The aircraft nacelle according to claim 19, wherein the first part (82) comprises a junction part (92) that ensures the junction between the lip (36), the front frame (38), and the cylindrical portion (86).

* * * * *